Dec. 12, 1933.  C. L. CUMMINS  1,939,163
PISTON RING
Filed April 2, 1930

Inventor:
Clessie L. Cummins.
By Rector, Hibben, Davis & Macauley
Attys

Patented Dec. 12, 1933

1,939,163

UNITED STATES PATENT OFFICE 1,939,163

PISTON RING

Clessie L. Cummins, Columbus, Ind., assignor to Oil Engine Development Company, Columbus, Ind., a corporation of Indiana Application April 2, 1930. Serial No. 440,881

7 Claims. (Cl. 309—25)

My invention relates to piston rings adapted more particularly for use in internal combustion or other compression engines.

The principal object of my invention is to provide a ring construction for pistons, especially for those operating under high pressure, that shall be arranged to provide an adequate seal with a cylinder wall, as well as limiting and controlling the outward radial movement of the ring under the pressure which may be exerted by fluid behind the ring, with a consequent diminution in the wear on the ring and frictional power loss.

A further object is to provide a ring of the character described which shall embody sufficient wearing surface to insure satisfactory heat transfer to the cylinder wall for the purpose of cooling the piston.

Other objects comprise the production of a ring having self-controlling features and one which may be seated in the groove with a minimum of effort.

These and further objects of my invention will be set forth in the following specification, reference being had to the accompanying drawing and the novel means by which said objects are effectuated will be definitely pointed out in the claims.

Figure 1:
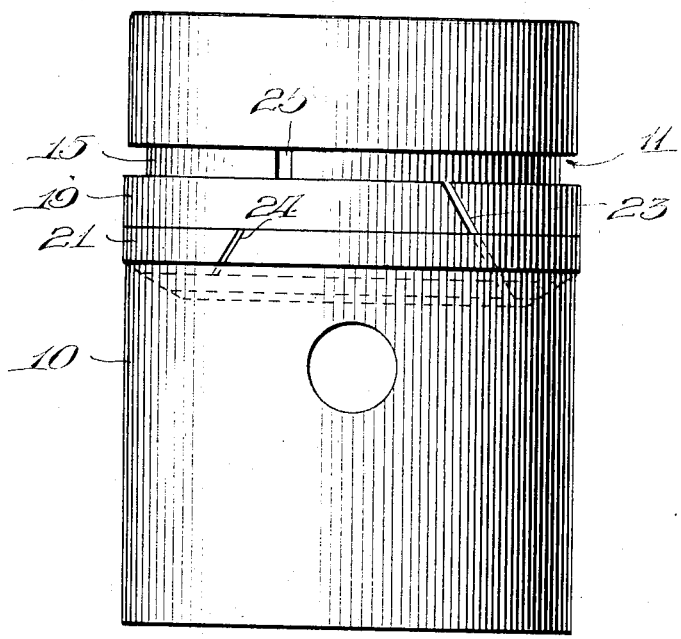
Fig. 1 shows an elevation of a piston with my improved ring construction positioned thereon.
Figure 2:
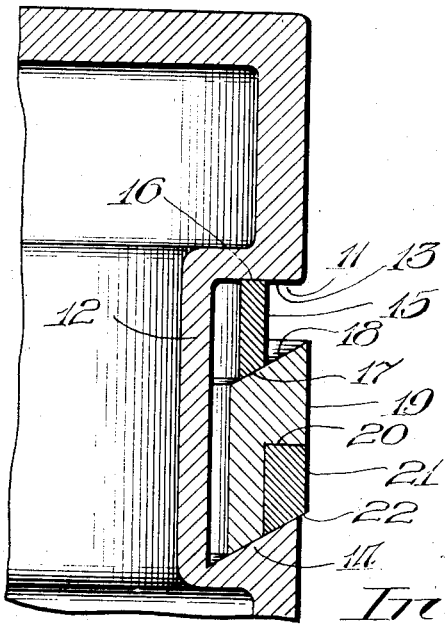
Fig. 2 is a sectional elevation of the piston shown in Fig. 1.

The numeral 10 represents a piston having a ring groove 11, including a peripheral base 12, a side wall 13 substantially parallel to the head of the piston, and a side wall 14 angularly disposed to said head and in converging relation outwardly to the side wall 13.

Seated within the ring groove 11 is my improved ring construction which includes an auxiliary ring 15 of relatively light structure having an upper flat face 16 which cooperates with the side wall 13 of the groove and a lower beveled face 17 which is substantially parallel to the side wall 14. The ring 15 is so constructed that its inherent tension is sufficient to maintain it in an expanded condition at all times. The face 17 of the ring 15 cooperates with the upper face 18 of a ring element 19 which is recessed as at 20 for the reception of a second ring element 21 having a lower face 22 which is aligned with the lower face of the ring element 19, both of said faces cooperating with the lower side wall 14. The ring elements 19 and 21 comprise the piston ring proper and the peripheral surfaces of said elements form the working face of the ring. The elements 19 and 21 are split as at 23 and 24, respectively, in the usual manner and these joints are circumferentially spaced when the piston ring is in position on the piston to prevent "blow by" through the slits. The auxiliary ring 15 is split as at 25, the width of this opening being relatively large for a purpose hereinafter explained.

In positioning my improved ring construction on the piston 10, the auxiliary ring 15 is first inserted in the groove and compressed to allow sufficient clearance for the insertion of the piston ring proper, including the elements 19 and 21, the width of the split 25 in the ring 15 permitting such contraction.

When the piston is operating in the cylinder, it is obvious that the fluid pressure behind the auxiliary ring 15 and the piston ring proper tends to move both rings outwardly and would otherwise cause the principal ring to bear against the cylinder wall with a pressure in excess of that required for a gas-tight seal. Undue wear would therefore result. However, the piston ring proper can only move outwardly by moving upwardly owing to the inclination of the side wall 14, but movement in this direction is effectually controlled by the presence of the auxiliary ring 15 and the fluid pressure exerted on the inclined upper face 18. Moreover, it will be observed that because of the inclined upper face of the ring proper, the component of the outward and downward thrusts of the fluid will be so exerted as to seat the ring proper more firmly on the side wall 14, thereby preventing leakage at this surface. Owing to the interlocking feature and the inclined coacting surfaces of my improved ring construction, the seal obtained with the cylinder wall is largely due to an outward pressure which is substantially equal to that which would be exerted by the inherent resiliency of the ring if the ring was not confined or influenced in any way by the inclined coacting surfaces. Accordingly, undue wear of the working face of the ring is avoided, as well as frictional power loss from that source. The auxiliary ring 15 and the ring proper also automatically adjust themselves to accommodate for any wear, thus maintaining this desirable condition.

While I have shown one set of elements and combinations thereof for effectuating my improved ring construction, it will be understood that the same is intended for purpose of illustration only and in nowise restricts my device to the exact forms and structures shown, for many changes may be made therein without departing from the spirit of my invention.

I claim:

1. The combination with a piston having a ring groove having outwardly converging side walls, of a piston packing ring mounted in said groove for contacting with a cylinder wall and arranged for endwise movement toward the head of the piston when subjected to an outward radial thrust, and an auxiliary ring cooperating with said piston ring for seating the same against that wall of the groove remote from the head of the piston.

2. The combination with a piston having a ring groove provided with a side wall parallel to the head of the piston and a side wall angularly disposed thereto in converging relation outwardly, of a piston packing ring seated in said groove for contacting with a cylinder wall and having an inclined face for coacting with said angularly disposed side wall, and an auxiliary ring cooperating with the opposite face of said piston ring and said first named side wall for seating said piston ring against said second named wall.

3. The combination with a piston having a ring groove provided with a side wall parallel to the head of the piston and a side wall angularly disposed thereto in converging relation outwardly, of a piston ring having parallel faces seated in said groove with one of said faces coacting with said angularly disposed side wall, and an auxiliary ring cooperating with the opposite face of said piston ring and said first named side wall for seating said piston ring against said second named wall.

4. The combination with a piston having a ring groove provided with a side wall parallel to the head of the piston and a side wall angularly disposed thereto in converging relation outwardly, of a piston ring seated in said groove for coacting with said angularly disposed side wall, said ring including a major ring element and a minor ring element inset therein, the peripheral surfaces of said elements constituting the working face of said ring, and an auxiliary ring cooperating with the opposite face of said piston ring and said first named side wall for seating said piston ring against said second named wall.

5. The combination of a piston having a ring groove provided with an inclined side wall, a piston packing ring structure for contacting with a cylinder wall and having an inclined edge face cooperating with said inclined side wall, and auxiliary means tending to seat said structure against said side wall.

6. The combination of a piston having a ring groove provided with an inclined side wall, a piston packing ring structure for contacting with a cylinder wall and having an inclined edge face cooperating with said inclined side wall, and an auxiliary ring tending to seat said structure against said side wall.

7. The combination with a piston having a ring groove provided with an inclined side wall remote from and extending outwardly toward the piston head, of a piston packing ring mounted in said groove for contact with a cylinder wall and having an inclined face seated against said wall, the outward thrust of the fluid pressure behind said ring being substantially restricted by the inclination of said side wall, and means for maintaining said ring in contact with said wall at all times.

CLESSIE L. CUMMINS.